United States Patent
Leung et al.

(10) Patent No.: US 9,634,739 B2
(45) Date of Patent: Apr. 25, 2017

(54) WIRELESS COMMUNICATION SYSTEM AND METHOD THEREOF

(71) Applicant: X.ON Communications Limited, Hong Kong (HK)

(72) Inventors: Chi Ho Leung, Hong Kong (HK); Yuet Fong, Hong Kong (HK)

(73) Assignee: X.ON COMMUNICATIONS LIMITED, Hong Kong (HK)

( * ) Notice: Subject to any disclaimer, the term of this patent is extended or adjusted under 35 U.S.C. 154(b) by 305 days.

(21) Appl. No.: 14/389,384

(22) PCT Filed: Jan. 15, 2014

(86) PCT No.: PCT/CN2014/070648
§ 371 (c)(1),
(2) Date: Sep. 30, 2014

(87) PCT Pub. No.: WO2014/111013
PCT Pub. Date: Jul. 24, 2014

(65) Prior Publication Data
US 2015/0085616 A1 Mar. 26, 2015

(30) Foreign Application Priority Data
Jan. 15, 2013 (HK) .................................. 13100582

(51) Int. Cl.
*H04B 7/00* (2006.01)
*H04B 11/00* (2006.01)
*H04L 1/00* (2006.01)

(52) U.S. Cl.
CPC .............. *H04B 7/00* (2013.01); *H04B 11/00* (2013.01); *H04L 1/00* (2013.01)

(58) Field of Classification Search
CPC .............. H04B 7/00; H04B 11/00; H04L 1/00
See application file for complete search history.

(56) References Cited

U.S. PATENT DOCUMENTS 4,972,480 A * 11/1990 Rosen ...................... H04B 1/69
  375/E1.001
6,151,394 A * 11/2000 Tatebayashi .......... H04L 9/0833
  380/277

(Continued)

FOREIGN PATENT DOCUMENTS

| CN | 102254552 A | 11/2011 |
| CN | 102509216 A | 6/2012 |
| HK | 1176805 A2 | 8/2013 |

OTHER PUBLICATIONS

International search report of PCT Patent Application No. PCT/CN2014/070648 issued on Apr. 3, 2014.

(Continued)

*Primary Examiner* — Luke Ratcliffe
*Assistant Examiner* — Hovhannes Baghdasaryan
(74) *Attorney, Agent, or Firm* — Wayne & King LLC

(57) ABSTRACT

The present invention relates to a wireless communication system and a method thereof. The wireless communication system comprises a signal encoding module for encoding a preset high-frequency audio signal frequency according to a preset encoding rule, and creating an encoding library for storing the code; a signal sampling module for sampling a high-frequency audio signal produced by a high-frequency audio signal generating device; a signal transformation module for performing Fourier transformation on the sampled audio signal firstly to transform the audio signal into frequencies, acquiring a main frequency from the transformed frequencies, and storing the acquired main frequency; a signal decoding module for decoding the main frequency into a preset code according to the code in the library; and an output module for outputting the decoded (Continued)

code. The wireless communication system and the method of the present invention do not need hardware supports, thereby reducing the cost.

16 Claims, 7 Drawing Sheets

(56) References Cited

U.S. PATENT DOCUMENTS

| | | | | |
|---|---|---|---|---|
| 6,526,385 B1* | 2/2003 | Kobayashi | ............ | G10L 19/018 348/423.1 |
| 6,631,390 B1* | 10/2003 | Epstein | ................ | H04L 9/0866 708/250 |
| 2003/0133515 A1* | 7/2003 | Kondo | ................ | G06F 1/1616 375/295 |
| 2004/0068399 A1* | 4/2004 | Ding | .................... | G10L 21/038 704/200.1 |
| 2004/0137929 A1* | 7/2004 | Jones | ................ | H04N 21/6582 455/517 |
| 2006/0019605 A1* | 1/2006 | Shau | .................... | H04B 5/0006 455/66.1 |
| 2006/0212501 A1* | 9/2006 | Gerrits | ................. | G10L 19/093 708/300 |
| 2010/0053169 A1* | 3/2010 | Cook | ........................ | G06F 3/16 345/440.1 |
| 2011/0182379 A1* | 7/2011 | Kim | ...................... | H04L 1/0076 375/268 |
| 2012/0232912 A1* | 9/2012 | Tammi | ................. | G10L 19/008 704/502 |

OTHER PUBLICATIONS

Search report of counterpart Hong Kong Short-term Patent Application No. 13100582.9 issued on Jan. 25, 2013.

* cited by examiner

US 9,634,739 B2

WIRELESS COMMUNICATION SYSTEM AND METHOD THEREOF

FIELD OF THE INVENTION

The present invention relates to a communication system and a method thereof, in particular to a system and a method for communication via an audio signal.

BACKGROUND

On current market, there are many non-contact communication devices in demand of hardware supports, for example, RFID technology which needs a special identification card in use. Taking its application to a membership card for example, a user who is the member of many shops needs to carry about a number of cards in consumption at different shops.

Although Bluetooth technology can be used in electronic devices for non-contact identification and in smart phones with no need of any special devices, its multi-site application only can be realized after being highly programmed and safety risk of cell phone may be increased with the Bluetooth on. Additionally, Bluetooth is power wasting. Therefore, an electronic device using Bluetooth as an identification terminal is unpractical. Furthermore, the Bluetooth technology is also high in cost to use due to its requirement to hardware such as interface, antenna.

SUMMARY

A technical problem to be solved by the present invention is to provide a wireless communication system and a method thereof which requires no hardware supports and have low cost, aiming at solving the defects in relevant arts To solve the technical problem, the present invention adopts a technical solution as follows. A wireless communication system comprises:
a signal encoding module for encoding a preset high-frequency audio signal frequency according to a preset encoding rule, and creating an encoding library for storing the code;
a signal sampling module for sampling a high-frequency audio signal produced by a high-frequency audio signal generating device;
a signal transformation module for performing Fourier transformation on the sampled audio signal firstly to transform the audio signal into frequencies, acquiring a main frequency from the transformed frequencies, and storing the acquired main frequency;
a signal decoding module for decoding the main frequency into a preset code according to the code in the library; and
an output module for outputting the decoded code.

The present invention further provides a wireless communication method, comprising the steps of:
encoding a preset high-frequency audio signal frequency according to a preset encoding rule, and creating an encoding library for storing the code;
sampling a high-frequency audio signal produced by a high-frequency audio signal generating device;
performing Fourier transformation on the sampled audio signal to transform the audio signal into frequencies;
acquiring a main frequency from the transformed frequencies, and saving the acquired main frequency;
decoding the acquired main frequency into a preset code according to the code saved in the library; and
outputting the decoded code.

The present invention has the beneficial effects that site identification of the signal generating device can be realized by encoding a high-frequency audio signal frequency, producing a high-frequency audio signal by a signal generating device and identifying the high-frequency audio signal by a wireless communication system installed on a terminal so as to require no hardware supports and reduce cost.

BRIEF DESCRIPTION OF DRAWINGS

The present invention will be further described in details with reference to the attached drawings and embodiments, and in the drawings.

DETAILED DESCRIPTION

Figure 1:
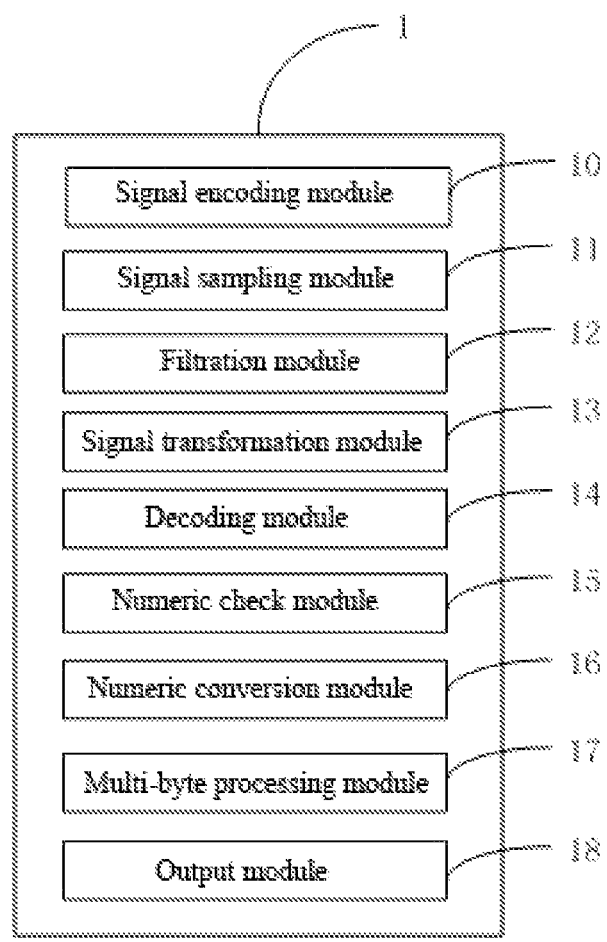
FIG. 1 is a block diagram of a wireless communication system according to a first embodiment of the present invention.

The present invention will be further described in details with reference to the attached drawings and embodiments.
FIG. 1 is a block diagram of a wireless communication system according to the first embodiment of the present invention. The wireless communication system 1 comprises a signal encoding module 10, a signal sampling module 11, a signal transformation module 12, a filtration module 13, a decoding module 14, a numerical check module 15, a numeric conversion module 16, a multi-byte processing module 17 and an output module 18.

Figure 2:
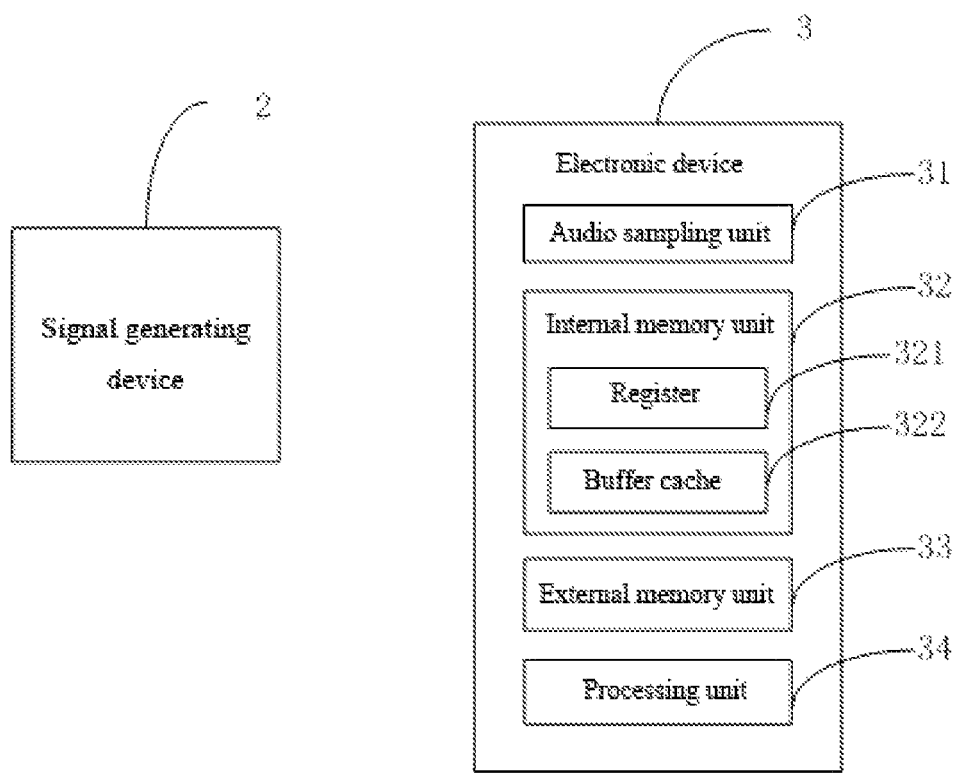
FIG. 2 is a schematic diagram of an application environment of the wireless communication system as shown in FIG. 1.

FIG. 2 is a schematic diagram of an application environment of the wireless communication system 1 as shown in FIG. 1. During application, the wireless communication system 1 is installed in the electronic device 3. The electronic device 3 comprises an audio sampling unit 31, an internal memory unit 32, an external memory unit 33 and a processing unit 34. The internal memory unit 32 further comprises a register 321 and a buffer cache 332. The processing unit 34 is used to execute the functions of each module of the wireless communication system 1.

The signal encoding module 10 is used for creating an encoding library according to a certain rule. The rule refers to using a preset high-frequency audio signal frequency to represent a code that is a binary code and also a Morse code. When the code is a binary code, each preset high-frequency audio signal code represents a value of each bit of the binary system. For example, the value "0" of the 0 bit of binary system is expressed in a frequency of 17157 Hz; the value "1" is represented with a frequency of 19832 Hz; the value "0" of the first bit is expressed in a frequency of 17337 Hz; the value "1" of the first bit is represented with a frequency of 19910 Hz, and by this analogy, the values of each bit of the binary system are set with a preset high-frequency audio signal frequency. When the code is a Morse code, the "-", "." and the spacing in the Morse code are expressed in a preset high-frequency audio signal, respectively. The Morse code while data processing is converted into a numeric string represented with "0", "1" and spacing, wherein "-" and "." are converted into "1" and "0", respectively. For example, "." is expressed in 17.1 Hz, "-" in 18.1 Hz and the spacing in 19.1 Hz.

In the embodiment, an XOR parity bit can be inserted between bit binary digits when the code is a binary number or a Morse code, and further expressed in a preset high-frequency audio signal frequency. For example, the value "0" of the first parity bit is expressed in a frequency of 20120 Hz and the value "1" is represented with a frequency of 20150 Hz.

The signal generating device 2 which is provided with the code library at its terminal is able to produce a high-frequency signal according to the preset code or the code input by a user. If the preset binary code or the user-input binary code is 110, the signal generating device 2 sequentially produces a band of audio signal frequencies that stand for the numbers.

The signal generating device 2 outputs the high-frequency audio signal at a low power so that a common user is unable to listen to the high-frequency audio signal. In the embodiment, the frequency of the high-frequency audio signal produced by the signal generating device 2 ranges from 17.1 Hz to 21.5 Hz, wherein the signal generating device 2 may be any electronic devices capable of producing audio signals, such as the electronic devices in shopping malls, the smart phones or the computers with horns. In practical applications, the signal generating device 2 can be set to produce different audio signals by presetting unlike IDs according to its specific application fields so that other electronic devices 3 that are communicating with the signal generating device 2 can identify the device 2 via the audio signal produced by the device 2. Generally, the signal generating device is able to produce 12 bits of signals, namely 4096 IDs distributable to different application terminals.

The signal produced by the signal generating device 2 usually covers from 5 mm to 10 cm; and the signal produced by a special signal generating device 2 may reach 10 m. The signal coverage of the signal generating device 2 mainly depends on the power of the amplifier installed herein, and may reach several meters in use of a DC-powered amplifier.

Preferably, the signal produced by the signal generating device is a clean sinusoidal signal so that the signal generated is relatively quiet. The square signal or the triangular wave signal may also be identified although noises may be produced. In the embodiment, a PWM signal source, a DDS signal source or a multi-frequency sinusoidal signal generator can be used to produce a clean sinusoidal signal.

When the signal produced by the signal generating device 2 is required to be identified by the system 1 through the electronic device 3, the electronic device 3 starts the system 1 in response to the user's operation to read and identify the audio signal produced by the signal generating device 2. For the specific method, please refer to FIG. 3. Firstly, in the step S301, the signal sampling module 11 samples an audio signal having a preset length produced by the signal generating device 2. In the embodiment, the electronic device 3 acquires the high-frequency audio signal via the audio sampling unit 31. In the embodiment, the audio sampling unit 31 is a microphone.

In the step S302, the filtration module 12 filters the sampled high-frequency audio signals to filter out high-frequency audio signals generated in ambient environment, such as knocking noise sounding from glass or metal. If "0" and "1" occur in a uniform frame signal, the signal is often deemed to be a high-frequency audio signal produced in ambient environment.

In the step S303, the signal transformation module 13 performs Fourier transformation on the sampled audio signal firstly to transform the audio signal into frequencies, and then acquires a main frequency from the transformed frequencies and stores the acquired main frequency into the internal memory.

In the step S304, the decoding module 14 acquires the frequency values from the memory one by one.

In the step S305, the decoding module 14 determines whether the acquired frequency value is one of the preset frequencies in the encoding table. If the acquired value is one of the preset frequencies in the encoding table, proceed to step 306; if the acquired value is not one of the preset frequencies in the encoding table, execute the step S304 to acquire the next frequency value.

In step S306, the decoding module 14 acquires the number corresponding with the frequency value from the encoding table and stores the number into the register 321. Taking the code in the encoding library as a binary number for example, if the frequency value is 17157 Hz, the number corresponding with the frequency value can be determined to be the number "0" corresponding with the 0 bit of the binary number; if the frequency value is 19910 Hz, the number corresponding with the frequency value can be determined to be the number "1" corresponding with the first bit of the binary number; if the frequency value is 20120 Hz, the number corresponding with the frequency value can be determined to be the number "1" of the first parity bit.

In step S307, the decoding module 14 determines whether the frequency values in the memory 31 are completely acquired. Return to the step S303 to acquire next frequency value if the frequency values have not been completely acquired; if the frequency values have been completely acquired, proceed to step S308.

In step S308, the decoding module 13 determines whether the register 321 is full? If the register is not full, execute the step S301 and resample an audio signal till the register 321 is fully written in numbers; if the register is not yet full, proceed to step S309.

In step S309, the numerical check module 15 checks whether the numerical value is correct. If the numerical value is incorrect, proceed to step S310; if the numerical value is correct, proceed to step S311. In the embodiment, the numerical value may be deemed to be an invalid value under following two conditions: In the first case, the numbers "0" and "1" of the same bit occurs successively, for example, 17157 Hz and 19852 Hz or 19334 Hz and 19910 Hz.

In the second case, determine whether the check code is matched with the logic checksum of the numerical value before the parity code; if the check code matches with the logical checksum, the numerical value is correct; if the check code does not match with the logical checksum, the numerical value is incorrect. For example, if the frequencies of the audio signal are 17157 Hz, 17334 Hz and 20120 Hz, the number after the audio signal is decoded is 100, wherein the parity code is 1 and the XOR checksum of 00 is 0, and therefore the numerical value is incorrect. For another example, if the frequencies of the audio signal are 17157 Hz, 19910 Hz and 20150 Hz, the numerical value after the audio signal is decoded is 010, wherein the parity code is the "0" of the second bit and the logic checksum of the numerical value "10" is "1", and therefore the numerical value is also incorrect.

In step S310, when the numerical value is incorrect, the numeric check module 15 resets the register 321 and the flow returns to the step S301 to resample an audio signal for identification.

In step S311, when the numerical value is correct, the numeric conversion module 16 decodes the numbers in the register 321 into characters which represent the numbers, such as decimal numbers, letters, characters, and saves the decoded characters into the buffer cache 322.

In step S312, the multi-byte processing module 17 determines whether the characters in the buffer cache 322 are multi-byte characters. If the characters are multi-byte characters, proceed to step S313, if the characters are not multi-byte characters, proceed to step S314.

In the embodiment, a multi-byte character identification code and a multi-byte character termination code can be set when the character is multi-byte. The character is determined to be a multi-byte character when a multi-byte character identification code in the buffer cache is identified by the multi-byte processing module 16.

In step S313, the output module 18 outputs the numerical value and ends the identification process.

In step S314, the multi-byte processing module 16 determines whether the character is the termination code of the multi-byte character. If the character is not the termination code of the multi-byte character, proceed to step S315, if the character is the termination code thereof, proceed to step S316.

In step S315, the multi-byte processing module 14 resets the register 321 and then returns to the step S301.

In step S316, the output module 18 outputs the value of a character string which is formed by multiple bytes saved in the buffer cache 322, and ends the identification process.

Figure 3:
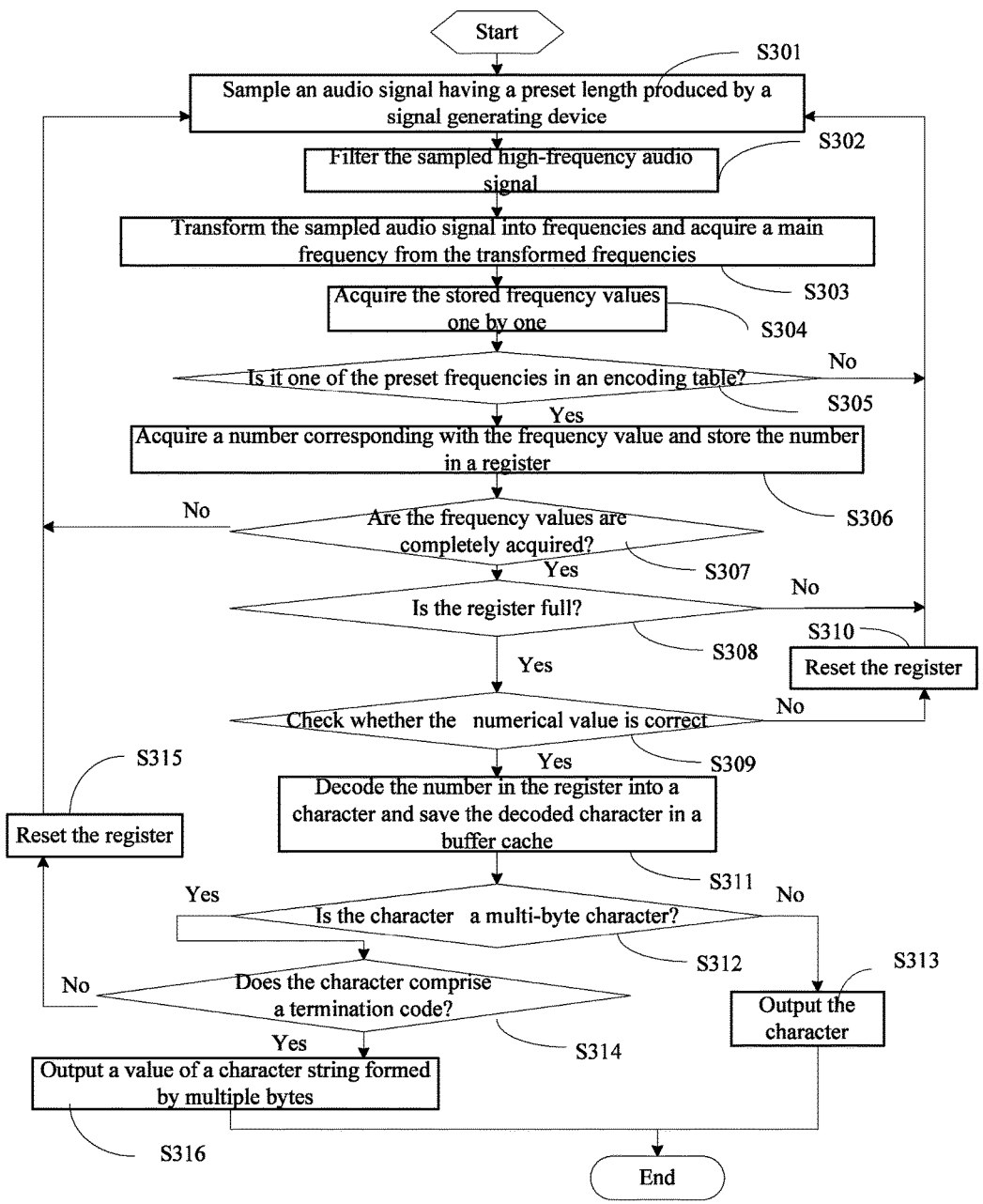
FIG. 3 is a flow chart of a method for identifying a high-frequency audio signal produced by a signal generating device in FIG. 2 according to the wireless communication system as shown in FIG. 1.
Figure 4:
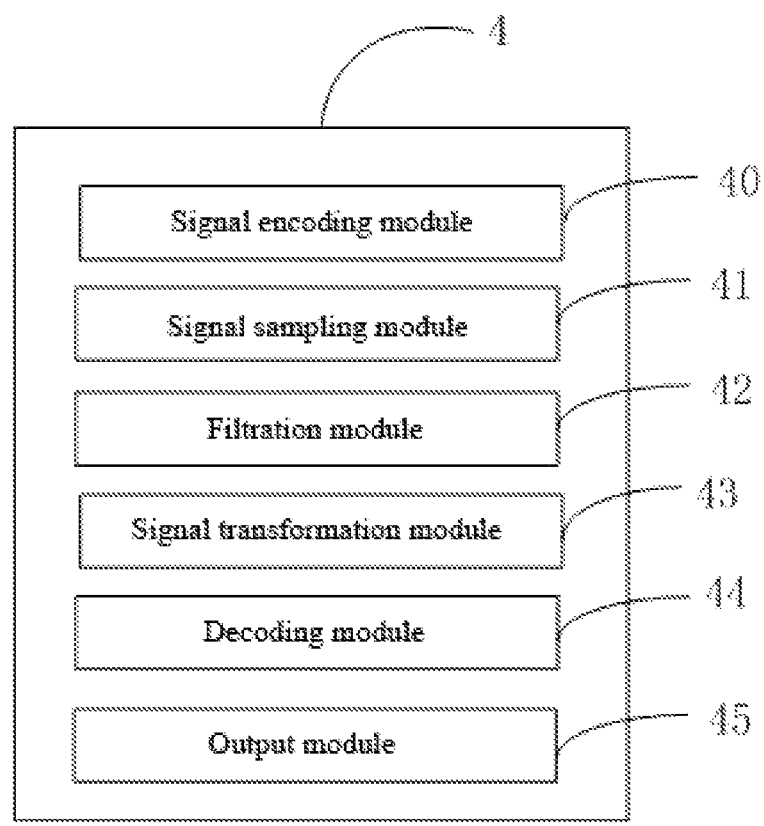
FIG. 4 is a block diagram of a wireless communication system according to a second embodiment of the present invention.
Figure 5:
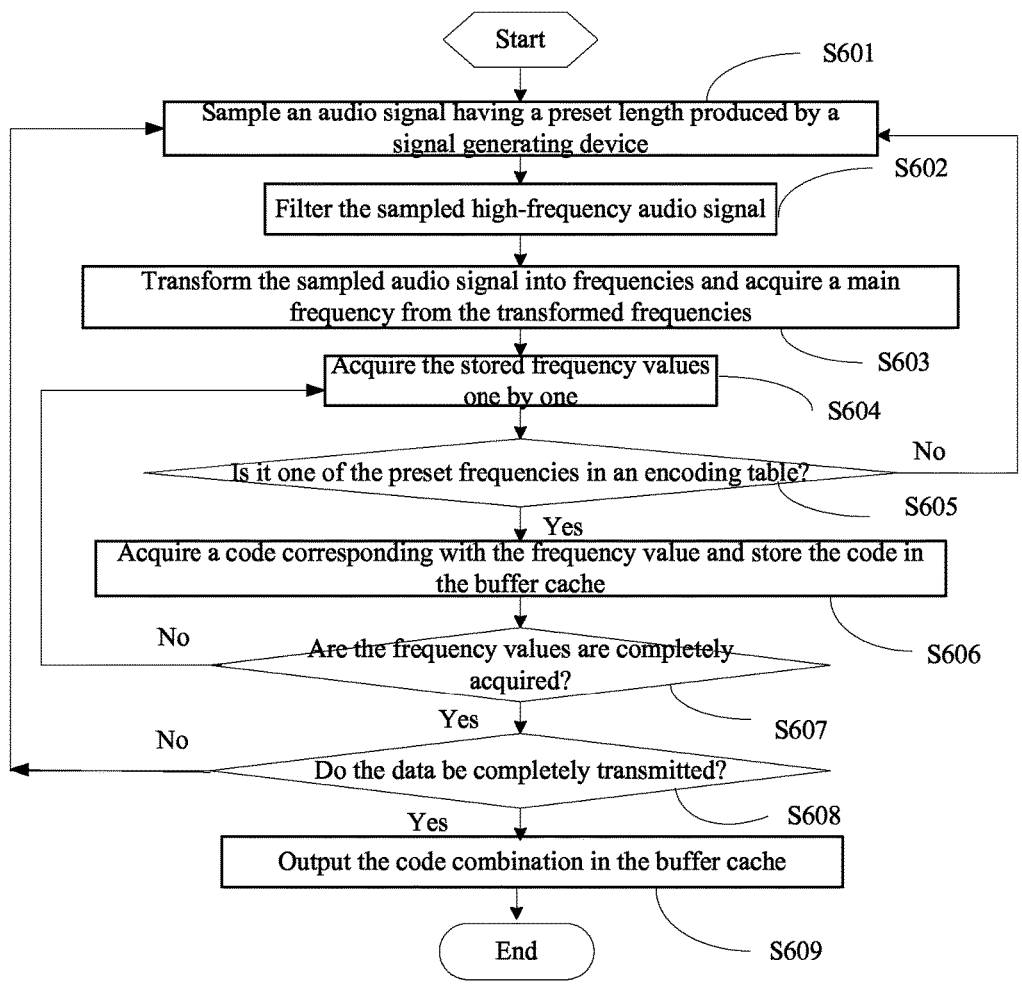
FIG. 5 is a flow chart of a method for identifying a high-frequency audio signal produced by a signal generating device according to the wireless communication system as shown in FIG. 4.

FIG. 4 and FIG. 5 are respectively a flow chart of a wireless communication system 4 according to a second embodiment of the present invention and a flow chart of a method for identifying a high-frequency audio signal produced by a signal generating device 2 according to the wireless communication system 4. The wireless communication system 4 comprises a signal encoding module 40, a signal sampling module 41, a filtration module 42, a signal transformation module 43, a decoding module 44 and an output module 45, wherein the signal encoding module 40 presets a code for each high-frequency audio frequency. The code may be a single character, such as a number and a letter, or a combination of characters. For example, the 17.1 Hz high-frequency audio signal is set with a code 6, the 17.2 Hz audio signal with a code 7, the 17.3 Hz high-frequency audio signal with a code 8 and so on. The signal sampling module 41, the filtration module 42 and the signal transformation module 43 have the same functions as that of the signal sampling module 11, the filtration module 12 and the signal conversion module 13 in the first embodiment. That is the steps of S601, S602 and S603 are identical to the steps of S301, S302 and S303. The functions of the decoding module 44 for executing the steps of S604 and S605 are same as that of the steps of S304 and S305 as shown in FIG. 3, and will not be repeatedly described any longer.

In step S606, the decoding module 44 acquires the code corresponding with the frequency value from the encoding table and stores the code into the buffer cache when the acquired frequency is one of the preset frequencies in the encoding table.

In step S607, the decoding module 44 determines whether the frequency values in the internal memory unit 32 are completely acquired. If the frequency values have not been completely acquired, return to the step S604; if the frequency values have been completely acquired, proceed to step S608.

In step S608, the output module 43 determines whether the data transmission is completed. If the data were transmitted completely, return to step S601; if the data were not transmitted completely, proceed to step S609.

In the embodiment, an initializer and a terminator can be preset. The initializer is a start identifier of the transmitted data and the terminator is a termination identifier of the transmitted data. A character read after the initializer is determined whether to be a terminator when confirming whether the data were transmitted completely, provided that the initializer had read first. If the character is the terminator, the data are confirmed to be transmitted completely; if the terminator is not read, the data has not read completely.

In step S609, the output module 45 outputs the code combination in the buffer cache.

In the embodiment, the output module 45 outputs the code between the initializer and the terminator.

Figure 6:
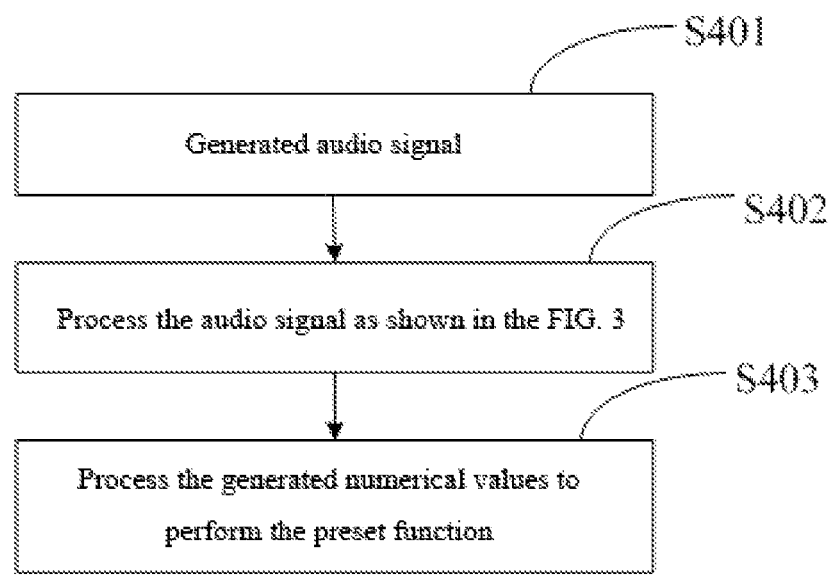
FIG. 6 is a flow chart of a signal processing method for an electronic device only receiving the audio signal produced by the signal generating device.

FIG. 6 is a flow chart of a signal processing method for an electronic device 2 only receiving the audio signal produced by the signal generating device 2. In step S401, receive the audio signal produced by the signal generating device 2.

In step S402, process the audio signal as shown in FIG. 3.

In step S403, process the generated numerical values to perform the default function.

Figure 7:
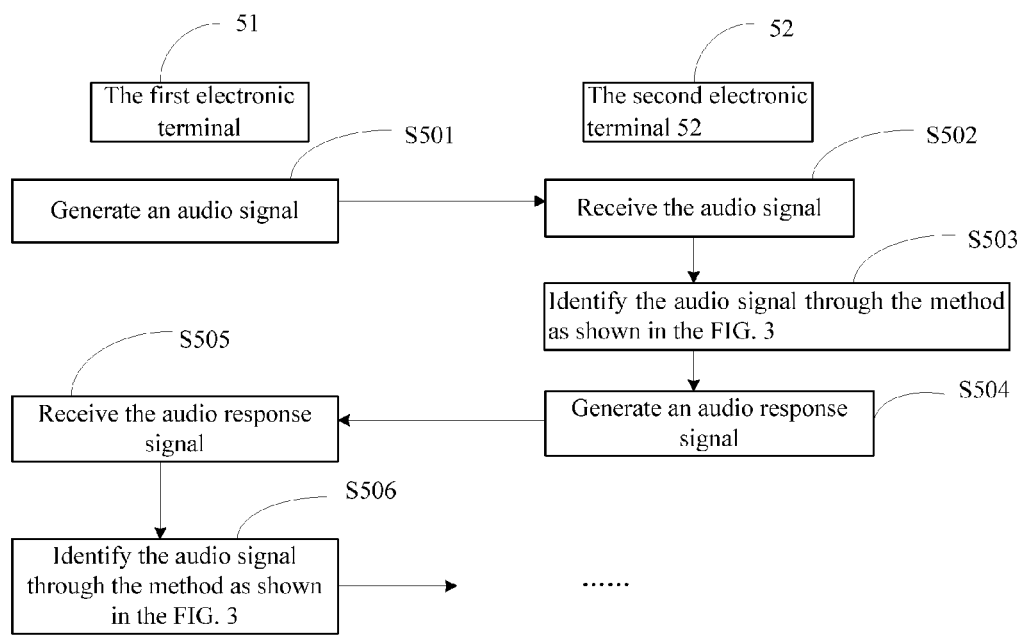
FIG. 7 is a flow chart of a method for using both a first electronic terminal and a second electronic terminal as a signal transmitting terminal and a signal receiving terminal to perform two-way communication.

FIG. 7 is a flow chart of a method for using both a first electronic terminal 51 and a second electronic terminal 52 as a signal transmitting terminal and a signal receiving terminal to perform two-way communication.

In step S501, the first electronic terminal 51 generates an audio signal according to user input values.

In step S502, the second electronic terminal 52 receives the audio signal.

In step S503, the second electronic terminal 52 identifies the audio signal through the method as shown in the FIG. 3.

In step S504, the second electronic terminal 52 generates an audio response signal.

In step S505, the first electronic terminal 51 receives the audio response signal, and identifies the audio signal through the method as shown in the FIG. 3. The communication between the two terminals continues till the communication protocol preset by the user terminates.

The foregoing descriptions are merely preferred embodiments of the present invention, but are not intended to limit the protection scope of the present invention, and any technical solutions under the concept of the present invention shall all fall within the protection scope of the present invention. It should be pointed out that a plurality of improvements and modifications figured out by a person having an ordinary skill without departing from the principle of the present invention shall also fall within the protection scope of the present invention.

The invention claimed is:

1. A wireless communication system, comprising:
a signal encoding module for encoding a preset high-frequency audio signal frequency according to a present encoding rule, and creating an encoding library for storing the code,
a signal sampling module for sampling a high-frequency audio signal produced by a high-frequency audio signal generating device;
a signal transformation module for performing Fourier transformation on the sampled audio signal firstly to transform the audio signal into frequencies, acquiring a main frequency from the transformed frequencies, and storing the acquired main frequency;
a signal decoding module for receiving the code from the encoding library and then decoding the acquired main frequency into a preset code according to the code in the library; and
an output module for outputting the decoded code;
wherein the encoding rule refers to using a preset high-frequency audio signal frequency to represent a value of each bit in a binary system, and inserting an XOR parity bit between every two bits of the binary system, wherein a value of each XOR parity bit is also represented by the preset high-frequency audio signal frequency.

2. The wireless communication system according to claim 1, wherein the system further comprises a filtration module used for filtering the high-frequency audio signal sampled by the signal sampling module to filter out high-frequency audio signals generated in ambient environment.

3. The wireless communication system according to claim 1, wherein the system further comprises a value check module which is used for checking whether the value is correct; the value is outputted through the output module only when the value is correct; if the value is incorrect, a high-frequency audio signal produced by the high-frequency audio signal generating device is re-sampled by the signal sampling module.

4. The wireless communication system according to claim 1, wherein the system further comprises a numeric conversion module which is used for decoding the main frequency into a binary number, decoding the binary number and then saving the binary number in a register of an electronic device that operates the system; the numeric conversion module transforms the binary number in the register as a character represented by the binary system, and saves the character in a buffer cache of the electronic device, and then the character is outputted by the output module.

5. The wireless communication system according to claim 1, wherein the code stored in the encoding library is further configured to comprise a multi-byte identification code and a multi-byte termination code; the system further comprises a multi-byte processing module for determining whether the value is a multi-byte identification code before the value is outputted by the output module; if the value is a multi-byte identification code, the signal sampling module continuously samples the high-frequency audio signal produced by the high-frequency signal generating device till the decoded value is a multi-byte termination code.

6. The wireless communication system according to claim 1, wherein the encoding rule refers to setting a code for each preset high-frequency audio frequency, and decoding the acquired high-frequency audio frequency into a preset code while decoding.

7. The wireless communication system according to claim 5, wherein an initializer and a terminator are preset; the initializer is a start identifier of the transmitted data and the terminator is a termination identifier of the transmitted data; the decoded code is the initializer; a code decoded after the initializer is determined whether to be a terminator; if the code decoded is the terminator, the output module determines that the data transmission is finished and outputs the code between the initializer and the terminator.

8. The wireless communication system according to claim 1, wherein the signal generating device outputs the high-frequency audio signal at a low power so that a common user is unable to listen to the high-frequency audio signal.

9. The wireless communication system according to claim 1, wherein a frequency range of the high-frequency audio signal produced by the signal generating device is from 17.1 Hz to 21.5 Hz.

10. The wireless communication system according to claim 1, wherein the high-frequency audio signal produced by the signal generating device is a sinusoidal signal.

11. A wireless communication method, comprising the steps of:
encoding a preset high-frequency audio signal frequency according to a preset encoding rule, and creating an encoding library for storing the code;
sampling a high-frequency audio signal produced by a high-frequency audio signal generating device;
performing Fourier transmission on the sampled audio signal to transform the audio signal into frequencies;
acquiring a main frequency from the transformed frequencies, and saving the acquired main frequency;
receiving the code from the encoding library;
decoding the acquired main frequency into a preset code according to the code saved in the library; and
outputting the decoded code;
wherein the encoding rule refers to using a preset high-frequency audio signal frequency to represent a value of each bit in a binary system, and inserting an XOR parity bit between every two bits of the binary system, wherein a value of each XOR parity bit is also represented by the preset high-frequency audio signal frequency.

12. The wireless communication method according to claim 11, comprising the step of filtering the sampled high-frequency audio signal to filter high-frequency audio signals generated in an ambient environment.

13. The wireless communication method according to claim 11, comprising the step of checking whether the value is correct, wherein the value is outputted when the value is correct; and a high-frequency audio signal is re-sampled if the value is incorrect.

14. The wireless communication method according to claim 11, comprising the step of decoding the main frequency into a binary number in the step of decoding the main frequency, wherein the method further comprises the step of transforming the binary number into a character represented by the binary system.

15. The wireless communication method according to claim 11, comprising the step of presetting the code in the encoding library to comprise a multi-byte identification code and a multi-byte termination code, and further comprising the step of determining whether the value is a multi-byte identification code, wherein if the value is a multi-byte identification code, the step of re-sampling the high-frequency audio signal is re-performed till the decoded value is a multi-byte termination code.

16. The wireless communication method according to claim 11, wherein the encoding rule refers to setting a code for each preset high-frequency audio frequency, and decoding the acquired high-frequency audio frequency into a preset code while decoding.

* * * * *